US009145084B2

(12) United States Patent
Eboli

(10) Patent No.: US 9,145,084 B2
(45) Date of Patent: Sep. 29, 2015

(54) AUXILIARY LIGHT MOUNT ASSEMBLY FOR TUBULAR BUMPERS

(71) Applicant: Omix-Ada, Inc., Suwanee, GA (US)

(72) Inventor: Alain Eboli, Lawrenceville, GA (US)

(73) Assignee: Omix-Ada, Inc., Suwanee, GA (US)

( * ) Notice: Subject to any disclaimer, the term of this patent is extended or adjusted under 35 U.S.C. 154(b) by 0 days.

(21) Appl. No.: 14/030,279

(22) Filed: Sep. 18, 2013

(65) Prior Publication Data

US 2015/0076300 A1 Mar. 19, 2015

(51) Int. Cl.
| | |
|---|---|
| *A47B 96/06* | (2006.01) |
| *B60Q 1/04* | (2006.01) |
| *B60R 11/00* | (2006.01) |
| *F16B 2/06* | (2006.01) |
| *B60Q 1/18* | (2006.01) |

(52) U.S. Cl.
CPC ............... *B60Q 1/0483* (2013.01); *B60Q 1/18* (2013.01); *B60R 11/00* (2013.01); *F16B 2/06* (2013.01)

(58) Field of Classification Search
CPC . F16M 13/00; F16M 13/02; F16M 2200/022; B60R 2011/0059; B60R 2011/0052; B60R 2011/0042; B60R 2011/005; B60R 11/00; F16L 13/00; F16L 13/02; F16L 13/08; F16L 13/1033; F16L 13/10; F16L 13/1041; F16L 13/1207; F16L 13/1211; G09F 2007/1813; G09F 7/18; F16B 2/00; F16B 2/065
USPC ................. 248/218.4, 219.1, 219.4, 67.5, 65; 362/476, 507
See application file for complete search history.

(56) References Cited

U.S. PATENT DOCUMENTS

| 1,777,884 | A | * | 10/1930 | Horix ......................... 248/230.5 |
|---|---|---|---|---|
| 5,634,620 | A | * | 6/1997 | Verot ....................... 248/229.14 |
| 6,106,189 | A | * | 8/2000 | Seale .............................. 403/398 |
| 6,407,713 | B1 | * | 6/2002 | Mallenius ...................... 343/765 |
| 6,588,637 | B2 | * | 7/2003 | Gates et al. ..................... 224/546 |
| 7,458,620 | B2 | * | 12/2008 | Rotole et al. .................... 289/16 |
| 7,874,533 | B1 | * | 1/2011 | Gates et al. ................. 248/205.1 |
| 2003/0168484 | A1 | * | 9/2003 | Gates et al. .................... 224/401 |
| 2008/0095573 | A1 | * | 4/2008 | Hewett et al. .................. 403/190 |
| 2010/0038505 | A1 | * | 2/2010 | Sonnenberg ............. 248/226.11 |
| 2011/0315829 | A1 | * | 12/2011 | Darnell ......................... 248/67.5 |
| 2012/0267408 | A1 | * | 10/2012 | DeVolder ....................... 224/544 |
| 2013/0207379 | A1 | * | 8/2013 | Meissner et al. ................. 285/64 |

* cited by examiner

*Primary Examiner* — Christopher Garft
(74) *Attorney, Agent, or Firm* — Womble Carlyle Sandridge & Rice LLP

(57) ABSTRACT

A clamp assembly adapted for attachment to a tubular beam includes first and second grips, with each grip having and at least four curved fingers projecting radially from the central portion and curving generally in the same direction to respective distal ends. The grips are secured together in a complementary relationship with the distal ends of the fingers of the first grip aligning with the distal ends of the fingers of the second grip to define a first generally cylindrical aperture extending through the fingers in a first direction and a second generally cylindrical aperture extending through the fingers in a second direction. The first cylindrical aperture has a diameter that substantially corresponds to the diameter of the tubular beam to which the clamp assembly is to be clamped. The clamp assembly generally includes a flange for attaching auxiliary equipment to the clamp assembly.

27 Claims, 4 Drawing Sheets

AUXILIARY LIGHT MOUNT ASSEMBLY FOR TUBULAR BUMPERS

TECHNICAL FIELD

This disclosure relates generally to clamp assemblies for mounting items of equipment to tubular beams, and in particular to clamp assemblies for adjustably coupling auxiliary lights to the tubular bumpers and roll bars of off-road vehicles.

BACKGROUND

Tubular bumpers and roll bars are often mounted to jeeps, trucks, dune buggies, sand rails, and other type of off-road vehicles to shield the vehicle from external hazards and to protect the vehicle and its occupants in the event of an accident or roll-over. Due to their positions at the front or top of the vehicle, these tubular beams can also offer advantageous locations for auxiliary lighting that can provide increased illumination of the area immediately surrounding the vehicle at night or in adverse weather conditions. As a result, an industry has developed to provide a variety of mounting systems for auxiliary lighting fixtures such as flood lights, spot lights, fog lights and the like to the off-road vehicle aftermarket.

However, the different manufacturers of tubular bumpers and roll bars have generally provided these protective structures in their own preferred designs, sizes and customized configurations, that in turn require auxiliary equipment mounting systems that have been custom fit for each tubular beam product. Thus, vehicle owners and other purchasers of auxiliary equipment have been compelled either to purchase these customized mounting systems at a premium price, to mount their auxiliary equipment at alternative less-desirable locations, or to seek other arrangements.

Consequently, a need exists for a mounting system or clamp assembly for auxiliary equipment that is adaptable to be used with a plurality of differently-sized tubular beams, and that can be applied by vehicle owners and other end users to mount their preferred auxiliary equipment products, such as after-market auxiliary lighting fixtures, at the desired location on their tubular bumpers or roll bars. It is toward such a mounting system or clamp assembly that the present disclosure is directed.

SUMMARY

Briefly described, one embodiment of the present disclosure includes a mounting system or clamp assembly that is configured to be clamped around a tubular beam to provide a mounting location for an auxiliary component. The clamp assembly includes a first grip having a central portion and at least four curved fingers projecting radially from the central portion and curving generally in the same direction to respective distal ends, and a second grip also having a central portion and at least four curved fingers projecting radially from the central portion and curving generally in the same direction to respective distal ends. The clamp assembly further includes a fastener for securing the first and second grips together in a complementary relationship with the distal ends of the fingers of the first grip aligning with the distal ends of the fingers of the second grip. When secured together, the grips define a first generally cylindrical aperture extending through the fingers in a first direction and a second generally cylindrical aperture extending through the fingers in a second direction. The first cylindrical aperture has a diameter that substantially corresponds to the diameter of the tubular beam to which the clamp assembly is to be clamped. In addition, a flange can be mounted to one of the grips and configured to receive an auxiliary component.

Another embodiment of the clamp assembly is adapted for attachment to a plurality of differently-sized tubular beams. The clamp assembly includes first and second grips, with each grip having a central portion defining a first plane and a plurality of angularly-spaced fingers curving radially outward and out-of-plane from the central portion to distal ends defining a second plane that is spaced from the first plane. Each finger includes an inside face with two curved surfaces separated by a center edge, with the curved surfaces extending in opposite directions to the inside faces of adjacent fingers to form a plurality of partial cylindrical surfaces. When the distal ends of the first and second grips are coupled together, different sets of partial cylindrical surfaces align to form multiple generally cylindrical split apertures, with each being adapted to clamp around differently-sized tubular beams. The clamp assembly also includes a flange for attaching auxiliary equipment such as a light fixture to the clamp assembly.

Another embodiment of the clamp assembly includes a first grip and a second grip, with each of the first and second grips comprising a central portion having a center axis and an outer face defining a first plane perpendicular to the center axis, and a plurality of angularly-spaced fingers curving radially outward and out-of-plane from the central portion to a plurality of distal ends that define a second plane that is spaced from and parallel to the first plane, and with each of the distal ends including provision for a fastener. The inside face of each finger further includes a first curved surface and a second curved surface that are separated by a center edge. Each curved surface extends in opposite directions across an inside face of the central portion to the curved surfaces of adjacent opposing fingers. This forms a first partial cylindrical surface and a second partial cylindrical surface that intersect at the center axis of the central portions. The sets of complimentary first and second partial cylindrical surfaces align to form first and second generally cylindrical split apertures. Each split aperture is configured to clamp around and secure the clamp assembly to at least one of a plurality of differently-sized tubular beams.

The clamp assembly can also include a plurality of fasteners or fastener assemblies extending between and coupling the distal ends of the fingers of the first and second grips. A flange may be coupled to one of the first and second grips that is configured to receive and couple auxiliary equipment to the clamp assembly.

Another embodiment of the present disclosure comprises a clamp assembly that is configured to be clamped around a tubular beam to provide a mounting location for an auxiliary component. The clamp assembly includes a first grip having an inner face with at least four curved surfaces separated by center edges, with the center edges of the first grip extending radially from a center axis and curving generally in the same direction toward respective attachment portions of the first grip, as well as a second grip also having an inner face with at least four curved surfaces separated by center edges, and with the center edges of the second grip extending radially from a center axis and curving generally in the same direction toward respective attachment portions of the second grip. The clamp assembly further includes a fastener for securing the first and second grips together in a complementary relationship with the attachment portions of the first grip aligning with the attachment portions of the second grip. When secured together, the curved surfaces define a first generally cylindrical aperture extending through the clamp assembly in a first direction and a second generally cylindrical aperture extending through the clamp in a second direction. The first cylindrical aperture has a diameter that substantially corresponds to the diameter of the tubular beam to which the clamp assembly is to be clamped. In addition, a flange can be mounted to one of the grips and configured to receive an auxiliary component.

Another embodiment of the present disclosure comprises a method of moving a mounting system or clamp assembly between a plurality of differently-sized tubular beams. The method includes uncoupling a pair of grips that are clamped around a first tubular beam having a first size, with each of the grips including a central portion and at least four fingers curving radially from the central portion and curving generally in the same direction to respective distal ends, with each finger including an inside face with two curved surfaces separated by a center edge, and with the curved surfaces extending in opposite directions to the inside faces of adjacent fingers to form a plurality of partial cylindrical surfaces. A first set of partial cylindrical surfaces aligns to form a first generally cylindrical split aperture that is sized and shaped to receive the first tubular beam when the distal ends of the grips are coupled together.

The method also includes removing the grips from around the first tubular beam, moving the clamp assembly to a second tubular beam having a second size that is different from the first size, positioning a second set of partial cylindrical surfaces of the grips around the second tubular beam, with the second set of partial cylindrical surfaces aligning to form a second generally cylindrical split aperture that is sized and shaped to receive the second tubular beam. The method further includes coupling together the distal ends of the grips to clamp and secure the clamp assembly to the second tubular beam.

The invention will be better understood upon review of the detailed description set forth below taken in conjunction with the accompanying drawing figures, which are briefly described as follows.

Figure 1:
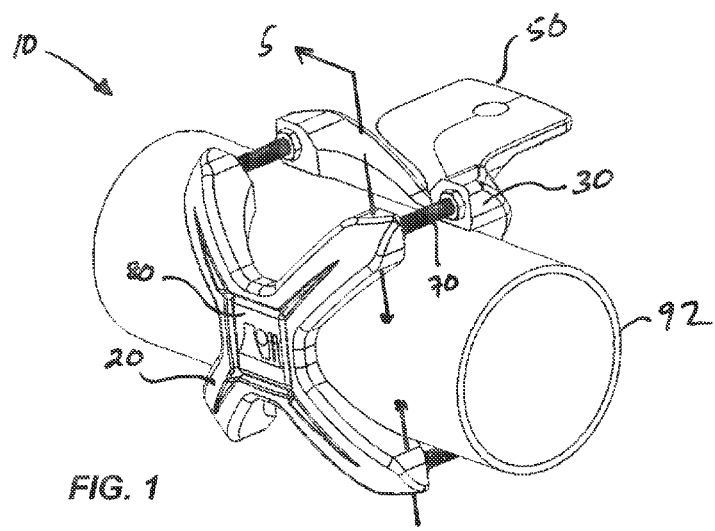
FIG. 1 is a front perspective view of a clamp assembly attached to a tubular beam, in accordance with a representative embodiment.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Illustrated in FIGS. 1-10 is a representative embodiment of a mounting system or clamp assembly for adjustably coupling an auxiliary light fixture or other equipment item to one of a plurality of differently-sized tubular beams, and in particular to various sizes of tubular bumpers and roll bars used with off-road vehicles. As described in more detail below, the clamp assembly of the present disclosure provides several significant advantages and benefits over other devices and methods for coupling auxiliary light fixtures or equipment items to the differently-sized tubular beams. The recited advantages are not meant to be limiting in any way, however, as one skilled in the art will appreciate that other advantages may also be realized upon practicing the present disclosure. It is also to be appreciated that the clamp assembly disclosed herein may not be limited to uses relating to the tubular bumpers and roll bars of off-road vehicles, and that other uses and applications are also possible and may be considered to fall within the scope of the present disclosure.

As used herein, "tubular beam" refers to a structural member, such as a rod, a shaft, a pole, a rail, and at the like, having an outer surface around which the clamp assembly may be clamped. The tubular beam may generally be round and hollow and comprising a cylindrical cross-section similar to that shown in the drawings. However, in some aspects the tubular beam may also be solid or formed with a non-round cross-sectional profile, including but not limited to an oval or a polygonal cross-sectional profile. In addition, the tubular beam may be aligned in any direction relative, including horizontal, vertical, or inclined orientations.

Referring now in more detail to the drawing figures, wherein like parts are identified with like reference numerals throughout the several views, FIG. 1 is a perspective front view of a clamp assembly 10 that can be removably attached to a tubular beam 92 so as to couple an auxiliary light fixture (not shown) or similar item of auxiliary equipment to the tubular beam 92. In some applications, the auxiliary light fixture may comprises a spot light, a flood light, a fog light, and the like. For other applications, a non-exhaustive list of auxiliary equipment items that may also be mounted to the tubular beam of the clamp assembly includes, but is not limited to, an antennae, a GPS receiver, a horn, a camera, a sensor, a photovoltaic solar panel, an LED display, and the like.

In some applications, the tubular beam 92 can be the tubular bumper or roll bar of an off-road vehicle such as a jeep, a truck, a dune buggy, a sand rail, and the like. The clamp assembly 10 is not limited to attachment to just one particular size of tubular beam, but is adapted for attachment along the length of any one of a plurality of differently-sized tubular beams such as those commonly be found in the off-road vehicle industry. In addition, the clamp assembly 10 generally includes an angularly-adjustable flange 50 that provides increased flexibility for positioning the auxiliary light fixture or equipment item in a variety of positions and angular orientations relative to the long axis of the tubular beam 92.

Figure 2:
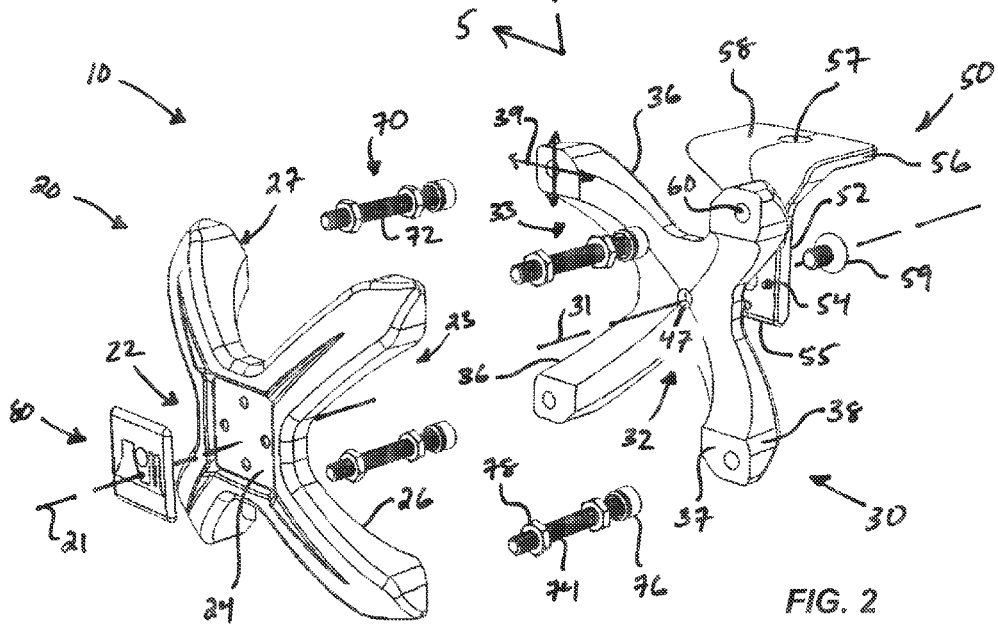
FIG. 2 is an exploded front perspective view of the clamp assembly of FIG. 1.
Figure 3:
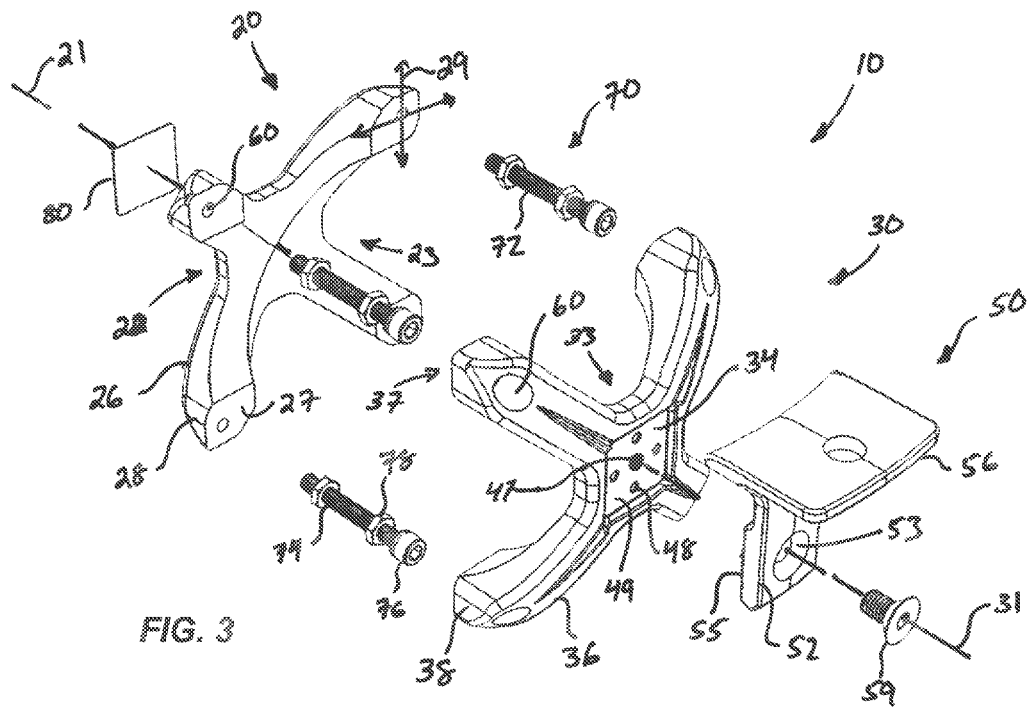
FIG. 3 is an exploded rear perspective view of the clamp assembly of FIG. 1.

As shown in the exploded perspective views of FIGS. 2-3, the clamp assembly 10 generally includes a first grip 20 and a second grip 30. Each of the first and second grips 20, 30 comprise central portions 22, 32 and a plurality of fingers 26, 36 that projecting radially outward and at angularly-spaced intervals from their respective central portions 22, 32. Each of the central portions 22, 32 has a center axis 21, 31, and an outer face 24, 34 that defines a first plane 25, 35 (FIG. 6) that is perpendicular to its respective center axis 21, 31. In addition, each of the fingers 26, 36 curves out-of-plane and away from the first plane 25, 35 of their respective central portion 22, 32 as they extend radially outward from the central portions, to terminate in distal ends 28, 38 having substantially-planar end surfaces 27, 37. The plurality of substantially-planar end surfaces 27, 37 of each of the first and second grips 20, 30 align together to define second planes 29, 39 (also FIG. 6) that are spaced from and parallel to their respective first planes 25, 35.

Each of the distal ends 28, 28 of the fingers 26, 36 of the first and second grips 20, 30 also include provision 60 for a fastener 70 that allows the first and second grips 20, 30 to be coupled together in a mirrored or facing relationship. In the illustrated embodiment 10 of the clamp assembly, the fasteners 70 can be machine screws 72 having a threaded portion 74 and a head portion 76, as well as one or more jam nuts 78 that are rotatably threaded onto the threaded portions 74 of the machine screws 72. It is to be appreciated, however, that other types of fasteners may also be used to coupled together the distal ends 28, 38 of the first and second grips 20, 30 in the above-described facing relationship, and may also be considered to fall with in the scope of the present disclosure.

Also shown in FIGS. 2-3 is the angularly-adjustable flange 50 that is coupled to the second grip 30. In the illustrated embodiment 10, the flange is coupled against the outer face 34 of the second grip 30 that defines the bracket's first plane 35 (FIG. 6) and includes a base portion 52 with a thru-hole 53 that is sized and shaped to receive the head of a mounting screw 59. The threaded portion of the mounting screw 59 extends through the thru-hole 53 of the base portion 52 to threadably engage with a threaded hole 47 formed through the central portion 32 of the grip 30. As shown, the base portion 52 can also include engagement structures, such as posts 54, that interface with complimentary engagement structures, such as sockets 48, that upon engagement hold and secure the flange 50 to the grip 30 without rotation. The base portion 52 may also be provided with a raised area 55 that fits within a complimentary recess 49 formed into the grip 30, with the lines of contact between the perimeter of the raised area 55 and the side surfaces of the recess 49 further serving to hold and secure the flange 50 to the grip 30.

In one aspect, the engagement structures 54, 48 can be angularly spaced at equal angular intervals around the thru-hole 53 and the threaded hole 47. As such, the flange 50 can be rotated or indexed relative to the grip 30 by removing the mounting screw 59, separating the flange 50 from the grip 30, rotating the flange relative to the grip, re-engaging the base portion 52 of the flange 50 with the outer face 34 of the grip 30, and re-engaging the mounting screw 59 within the threaded hole 47. With regard to the illustrated embodiment of the clamp assembly 10, the angular spacing between the engagement structures 54, 48 and the shape of the raised area 55 and its complimentary recess 49 provide for the indexed rotation of the flange 50 at ninety-degree intervals. Nevertheless, the skilled artisan will appreciate that the size, shape and angular spacing between the engagement structures 54, 48 and between the raised area 55 and the recess 49 can be varied to provide different indexing intervals. This includes smaller rotation intervals that allow for the flange to extend at oblique angles relative to the longitudinal axis of the tubular beam.

The flange 50 can further include a flange portion 56 that extends laterally from one end of the base portion 52, and includes a contact face 58 and another thru-hole 57. The flange portion 56 can generally provide a base surface or structure for the mounting apparatus of an auxiliary light fixture (not shown, but known to one of skill in the art) or other equipment item, as described above.

Also shown in FIGS. 2-3 is a logo plate 80 that can be mounted to the central portion 22 of the first grip 20 to provide a finished and customizable look to the clamp assembly 10. The logo plate 80 can be angularly adjustable and aligned to the outer face 24 of the central portion 22 that defines the first plane 25 (FIG. 6) of the first grip 20, and in a manner similar to the way the flange 50 is angularly adjustable and aligned with the outer face 34 of the second grip 30 using engagement structures and/or outer shape of the logo plate and the shape of the complimentary recess formed into the central portion 22 of the first grip 20. Indeed, in one aspect the first grip 20 and second grip 30 can be configured so that logo plate 80 and the flange 50 and reversible and interchangeable between the two grips, in which case the primary difference between the two grip can be the fastening provisions 60 formed into the distal ends 28, 38 of the fingers 26, 36.

Figure 4:
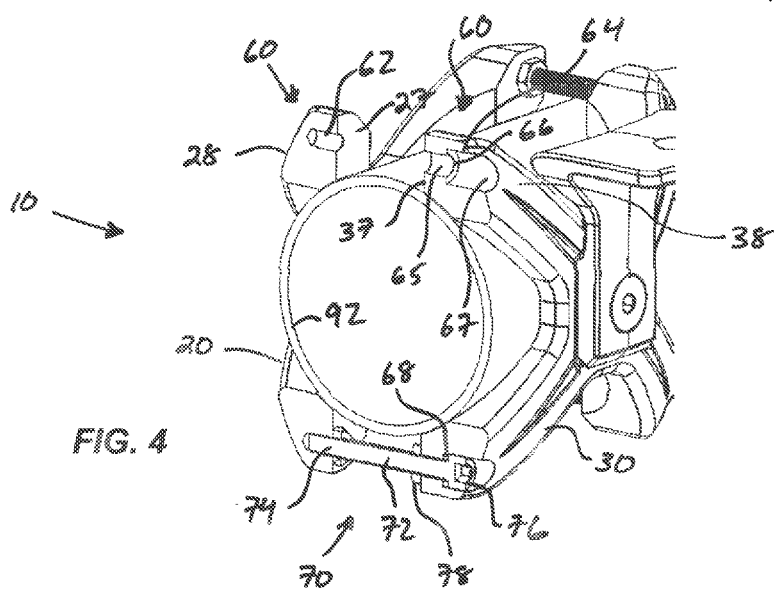
FIG. 4 is a perspective, cross-sectional view of the clamp assembly as taken from Section Line 5-5 in FIG. 1.

FIG. 4 is a perspective, cross-sectional view of the representative embodiment of the fastener 70, or machine screw 72, and the provisions 60 for the machine screw 72 that have been formed into the distal ends 28, 38 of the fingers 26, 36. For instance, each of the distal ends 28 of the fingers 26 of the first grip 20 can included a threaded hole 62 formed into the substantially planar surface 27, with the threaded hole being adapted to engage with the threaded end 74 of the machine screw 72. The threaded hole 62 can be closed (as shown), or can extend all the way through the finger 26.

A non-threaded rabbet hole 64 can be formed into the distal ends 38 of the fingers 36 of the second grip 30. The rabbet hole 64 can have an outer passage 67 sized to receive the head portion 76 of the machine screw 72 and an inner passage 65 sized to receive only the treaded portion 74, and with an interior rabbet surface 66 that abuts the head portion 76 of the machine screw. In some aspects, a gasket member or washer 68 can be installed between the head portion 76 of the machine screw 72 and the rabbet surface 66 to provide a level of compliance or tensioning pre-load when the two grips 20, 30 are fastened together around the tubular beam 92. The gasket member or washer 68 can be made from metal or from a compliant material such as rubber or a synthetic elastomer. If metal, the washer 68 may be cut and formed into a spring-type lock washer to provide the desired compliance or fastening pre-load.

To install the machine screw 72 to the second grip 30, the washer 68 can be moved over the threaded portion 74 to contact the head portion 76, and then the machine screw can be inserted through the inner passage 65 of the rabbet hole 64 until the washer 68 contacts the rabbet surface 66 and the threaded portion 74 projects out of the planar surface 37 of the finger 36. One or more jam nuts 78 can then be threaded onto the threaded portion 74, leaving enough open thread for the machine screw 72 to engage with the threaded hole 62 when the two grips are assembly around the tubular beam. The machine screw 72 can then be rotated to engage the threads and draw the screw into the threaded hole 62 until the head portion 76 presses the washer 68 against the rabbet surface 66 to firmly clamp the two grips 20, 30 around the tubular beam. At this point the jam nuts 78 can be backed out to bear against one or both of the substantially planar surfaces 27, 37 to prevent any further rotation of the machine screw 72 relative to the threaded hole 62, thereby locking the clamp assembly 10 to the tubular beam.

Of course, it is not required that the threaded holes 62 be formed into the fingers 26 of the first grip 20 or that the rabbet holes 64 be formed into the fingers 36 of the second grip 30. It is to be appreciated, moreover, that the fastening provisions 60 for the fasteners 70 can be reversed or altered in a variety of ways known to those of skill in the art while continuing to fall within the scope of the present disclosure. In addition, the first and second grips can be locked together using fasteners other than threaded machine screws. For example, a mechanical latch may be used to draw the distal ends of the two sets of fingers together and to tighten the grips around a tubular beam without the use of threaded machine screws or bolts.

Figures 5A, 5B:
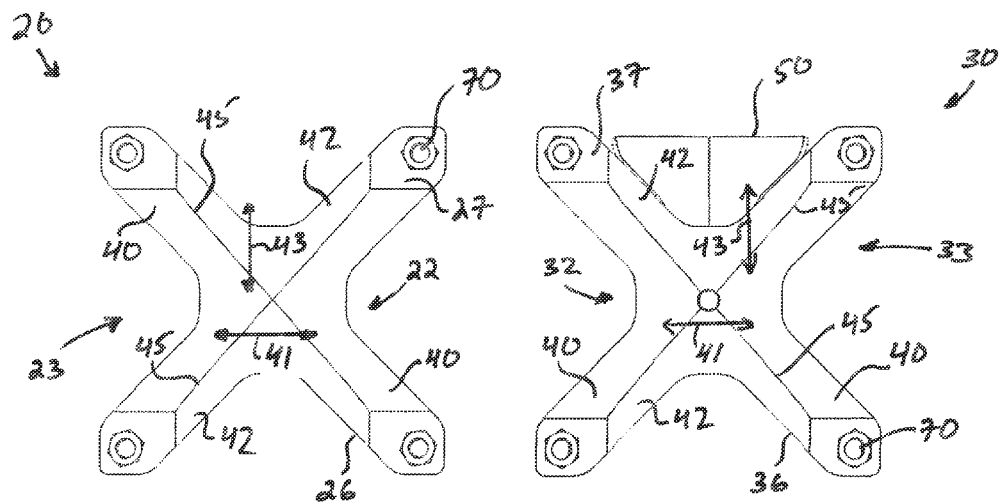
FIGS. 5A and 5B are views of the interior faces of the first and second grips of the clamp assembly of FIG. 1.

FIGS. 5A-5B are views of the interior faces 23, 33 of the first and second grips 20, 30 of the clamp assembly 10, and provide additional perspective of the structural relationship between the central portions 22, 32, the center axes 21, 31, and the plurality of fingers 26, 36 that project radially outward from their respective central portions 22, 32 at angularly-spaced intervals. FIGS. 5A-5B also illustrate the substantially-planar end surfaces 27, 37 that can be located at the distal ends 28, 38 of the fingers 26, 36, as well as the location of the provisions for the fasteners 70 across the substantially-planar end surfaces 27, 37.

As can be seen, the inside face of each finger 26, 36 can comprise a first curved surface 40 and a second curved surface 42 separated by a center edge 45 that extends radially, or lengthwise, along the inside face of the finger 26, 36 from central portion 22, 32 to the distal ends 27, 37. For each finger 26, 36, the curved surfaces can extend laterally or angularly in opposite directions across the inside face of the central portion 22, 32 to the curved surfaces of the adjacent opposing fingers. As shown in the drawings, this arrangement can subdivide the interior faces 23, 33 of both grips 20, 30 into two opposed first curved surfaces 40 and two opposed second curve surfaces 42. With each grip, the two opposed first curved surfaces 40 can align to define a first partial cylindrical surface 41, and the two opposed second curved surfaces 42 can similarly align to define a second partial cylindrical surface 43. The first and second partial cylindrical surfaces 41, 42 can be formed with different diameters or radii of curvature for the purposes discussed in more detail below.

Figure 6:
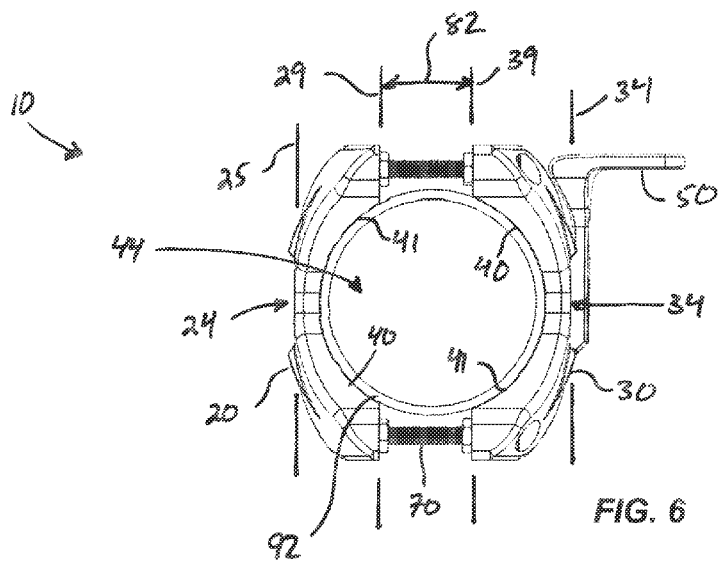
FIG. 6 is a side view of the clamp assembly and tubular beam of FIG. 1.

When the first and second grips 20, 30 are coupled together to assemble the clamp assembly 10, the set of first partial cylindrical surfaces 41 can align to define a first generally cylindrical split aperture 44 that is sized and shaped to receive a tubular beam 92 of a first size, as illustrated in FIG. 6. The split aperture 44 can include a first gap 82 between the substantially-planar end surfaces 27 of the first grip 20 and the substantially-planar end surfaces 37 of the second grip 30, so that the second planes 29, 39 defined by the plurality of end surfaces 27, 37 of the first and second grips 20, 30, respectively, are spaced from each other. In one aspect, the second planes 29, 39 can align substantially parallel with each other upon assembly so that the clamping assembly 10 provides a symmetric and uniform grip on the tubular beam. In another aspect (not shown), the planes 29, 39 may be non-parallel as one of both of the grips 20, 30 becomes cocked or misaligned during the assembly process of tightening each of the four fasteners 70. Depending on the tolerances provided by the fasteners 70 and the fastening provisions 60 formed into the distal ends of the fingers, however, the arc length of the partial cylindrical surfaces 41 can be sufficient to continue to secure the clamping assembly 10 to the tubular beam 92, even with substantial misalignment.

Figure 7:
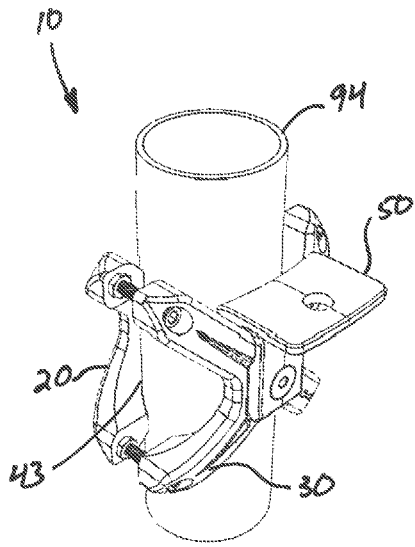
FIGS. 7 and 8 are a perspective view and a top view, respectively, of the clamp assembly of FIG. 1 attached to another differently-sized tubular beam.
Figure 8:
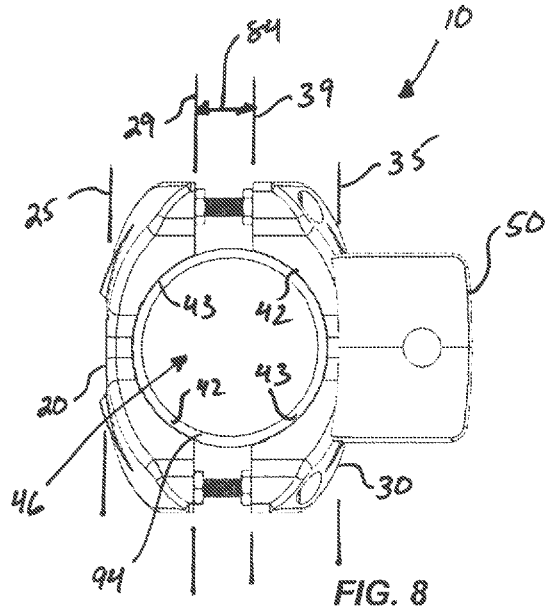

When the first and second grips 20, 30 are coupled together to assemble the clamp assembly 10, as discussed above, the set of second partial cylindrical surfaces 43 can also align to form a second generally cylindrical split aperture 46 that is configured to receive a tubular beam 94 of a second size that is different than the first size, as shown in FIGS. 7-8. With the grips 20, 30 each having four fingers 26, 36, and with the inside face of each finger having a first curved surface 40 and a second curved surface 42 separated by a center edge 45 that extends radially, or lengthwise, along the inside face of the finger 26, 36, the resulting first partial cylindrical surfaces 41 and second partial cylindrical surfaces 43 can be orthogonal to each other, so that the first split aperture 44 and the second split aperture 46 are also orthogonal to one another.

In other embodiments, however, it is contemplated that each of the grips can have more than four fingers, so that the curved surfaces formed into the inside faces of the fingers can align to form three or more partial cylindrical surfaces that are non-orthogonally aligned, as well as three or more non-orthogonally aligned, generally cylindrical split apertures having different diameters.

In addition, in some aspects the first curved surfaces and the second curved surfaces that comprise the inside faces of the fingers may not be formed on a constant radius, and instead may be formed with a variable radius that results in a split aperture having an oval or other non-round curved shape. Furthermore, the first curved surfaces and the second curved surfaces may not be smoothly curved along their extents from the central portions to the distal ends of the grip, and may instead comprise a plurality of faceted planar surfaces that join or merge together at one or more oblique angles, with the oblique angles being ninety degrees or greater. In this way, the split apertures formed by the coupled first and second grips can be sized and shaped to be assembled around non-round tubular beams having oval, polygonal, or even square cross-sections, and the like.

It is also contemplated that in yet another embodiment of the clamp assembly that the two grips may not include fingers. Instead, each grip can comprise an inner face with at least four curved surfaces separated by center edges, with the center edges of the first grip extending radially from the center axis and curving generally in the same direction toward respective attachment portions formed into the first grip, and with the center edges of the second grip extending radially from the center axis and curving generally in the same direction toward respective attachment portions formed into the second grip. In one aspect, the attachment portions may be flats or recesses formed into the corners of each grip. As with the embodiments described above, the attachment portions can also include provision for fasteners so that the fasteners can secure the first and second grips together in a complementary relationship when the attachment portions of the first grip are aligned with the attachment portions of the second grip. Likewise, the curved surfaces formed into the inner faces of the grips can define a first generally cylindrical aperture extending through the clamp assembly in a first direction and a second generally cylindrical aperture extending through the clamp assembly in a second direction when the two grips are secured together.

In the representative embodiment of the clamp assembly 10 illustrated herein, the first generally cylindrical split aperture 44 can be sized to received a tubular beam 92 that is about three inches in diameter, as shown in FIGS. 1 and 6, while the second generally cylindrical split aperture 46 can be sized to received a tubular beam 94 that is about two and a half inches in diameter (FIGS. 7 and 8). In both cases, the first curved surface 40 and second curved surface 42 can be shaped to substantially conform to rounded sides of the tubular beam. In other words, the first curved surfaces 40 and second curved surfaces 42 can have the same radius of curvature as the tubular beam they are intended to clamp around. This configuration can result in a relatively large and dispersed contact surface that extends across the interior faces of the first and second grips 20, 30, and that can provide a large, uniform and stable clamping force that secures the clamp assembly 10 to the tubular beam.

Figure 9:
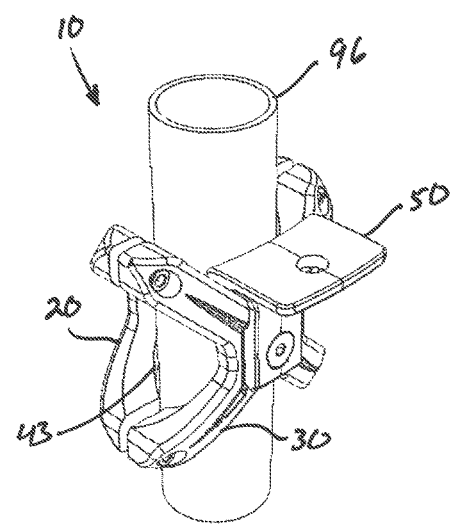
FIGS. 9 and 10 are a perspective view and a top view, respectively, of the clamp assembly of FIG. 1 attached to yet another differently-sized tubular beam.
Figure 10:
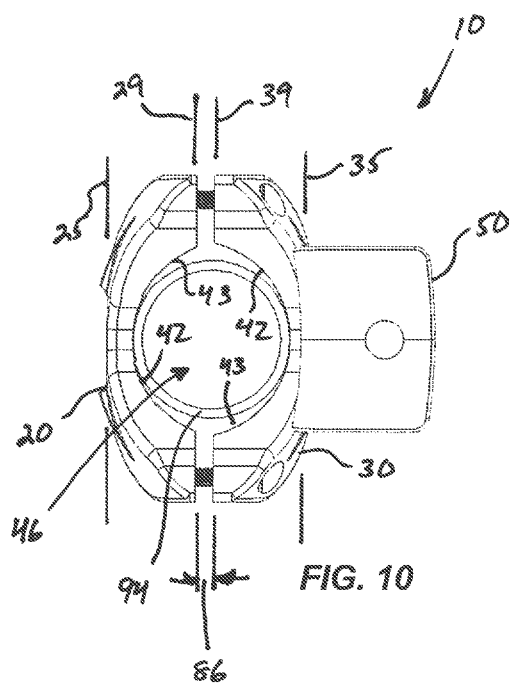

Nevertheless, the generally cylindrical split apertures 44, 44 of the clamp assembly 10 may not be limited to clamping around tubular beams or members having a radius of curvature that substantially matches the radius of curvature of the curved surfaces formed into the inside faces of the fingers. In some aspects, the clamp assembly 10 can also provide sufficient clamping force to secure the clamp assembly 10 to a tubular beam having a radius of curvature that is nominally smaller than the radius of curvature of the curved surfaces. For example, as shown in FIGS. 9-10, the clamp assembly 10 can be mounted around a tubular beam 96 having a diameter of about two inches and a radius of about one inch, and that is smaller than the one and a quarter inch radius of curvature of the curved surfaces 42 and partial cylindrical surfaces 43 that form the split aperture 46 with a two and a half inch diameter. Nevertheless, by shortening the distance between the second planes 29, 39 to a gap 86 that is smaller than the gap 84 in the same split aperture 46 clamped around a "full-sized" tubular beam 94 (as shown in FIG. 8), much of the extra spacing can be removed and sufficient contact area between the tubular beam 96 and the two grips 20, 30 have be provided to secure the clamp assembly 10 to the smaller tubular beam 96.

The invention has been described in terms of preferred embodiments and methodologies considered by the inventors to represent the best mode of carrying out the invention. However, a wide variety of additions, deletions, and modification might well be made to the illustrated embodiments by skilled artisans without departing from the spirit and scope of the invention. For example, while the base material of the clamp and flanges can generally comprise a lightweight aluminum alloy, the primary structural components of the clamp assembly can also be made from various other metal alloys or non-metal materials, such as plastics, thermoplastics, fiber-embedded composites, and the like. Similarly, the inside faces of the fingers and central portions may comprise exposed base material or a base material covered with a light coating, such as paint, while in other aspects the interior faces can be coated with a gasket material or comparable compliant layer that can enhance the grip of the clamp assembly around the tubular beam and/or protect the surfaces of the tubular beam from scratches or metal-on-metal corrosion. These and other revisions might be made by those of skill in the art without departing from the spirit and scope of the invention that is constrained only by the following claims.

What is claimed is:

1. A clamp assembly configured to be clamped around a tubular beam to provide a mounting location for an auxiliary component, the clamp assembly comprising:
   a first grip having a central portion and at least four separate curved fingers projecting radially from the central portion and curving generally in the same axial direction to respective distal ends;
   a second grip having a central portion and at least four separate curved fingers projecting radially from the central portion and curving generally in the same axial direction to respective distal ends;
   a fastener for securing the first and second grips together in a complementary relationship with the distal ends of the fingers of the first grip aligning with the distal ends of the fingers of the second grip;
   the grips, when secured together, defining a first split aperture extending through the fingers in a first direction and a second split aperture extending through the fingers in a second direction;
   the first split aperture having a diameter that substantially corresponds to the diameter of the tubular beam to which the clamp assembly is to be clamped; and
   a flange mounted to one of the grips and being configured to receive the auxiliary component.

2. The clamp assembly of claim 1, wherein the first split aperture is smaller than the second split aperture.

3. The clamp assembly of claim 2, wherein the first split aperture is sized to secure the clamp assembly to tubular beams having a diameter between about 2 inches and about 2.5 inches.

4. The clamp assembly of claim 2, wherein the second split aperture is sized to secure the clamp assembly to tubular beams having a diameter of about 3 inches.

5. The clamp assembly of claim 1, wherein the first split aperture and the second split aperture are orthogonal to each other.

6. The clamp assembly of claim 1, wherein an inside face of each finger is coated with a compliant gasket material.

7. The clamp assembly of claim 1, wherein the flange is adjustably coupled to the central portion of one of the first and second grips.

8. The clamp assembly of claim 7, wherein the flange is adjustably coupled to one of the first and second grips in one of a plurality of angular positions.

9. The clamp assembly of claim 1, wherein the fastener further comprises a machine screw having a threaded portion and a head portion.

10. The clamp assembly of claim 9, further comprising:
    threaded holes at the distal ends of the first grip for threaded engagement with the threaded portion of the machine screw; and
    non-threaded rabbet holes at the distal ends of the second grip for receiving the head portion of the machine screw.

11. The clamp assembly of claim 1, wherein the first and second split apertures are non-round.

12. A clamp assembly for attachment to a tubular beams, the clamp assembly comprising:
    a first grip and a second grip, each of the first and second grips including a central portion defining a first plane, and a plurality of angularly-spaced separate fingers projecting radially outward and curving out-of-plane from the central portion to distal ends defining a second plane that is spaced from the first plane;
    each finger having an inside face comprising two curved surfaces separated by a center edge, each curved surface extending in opposite directions to an inside face of an adjacent finger, the curved surfaces together forming a plurality of partial cylindrical surfaces; and
    a plurality of fastener assemblies extending between and coupling the distal ends of the fingers of the first and second grips,
    wherein complimentary sets of the partial cylindrical surfaces align to form split apertures sized and shaped to receive at least one of a plurality of differently-sized tubular beams when the distal ends of the first and second grips are coupled together, and to clamp around and secure the clamp assembly to the tubular beam.

13. The clamp assembly of claim 12, wherein one of the split apertures is sized to secure the clamp assembly to tubular beams having a diameter between about 2 inches and about 2.5 inches.

14. The clamp assembly of claim 12, wherein one of the split apertures is sized to secure the clamp assembly to tubular beams having a diameter of about 3 inches.

15. The clamp assembly of claim 12, wherein the plurality of partial cylindrical surfaces are orthogonal to each other.

16. The clamp assembly of claim 12, wherein the second planes of the first and second grips are substantially parallel to and spaced from each other.

17. The clamp assembly of claim 12, wherein the inside face of each finger is coated with a compliant gasket material.

18. The clamp assembly of claim 12, further comprising a flange coupled to one of the first and second grips and configured to receive and mount auxiliary equipment to the clamp assembly.

19. The clamp assembly of claim 18, wherein the flange is coupled to the central portion of one of the first and second grips.

20. The clamp assembly of claim 19, wherein the flange is configured for angular adjustment between a plurality of angular positions.

21. The clamp assembly of claim 12, wherein each of the fastener assemblies further comprises:
   a machine screw having a threaded portion and a head portion; and
   at least one jam nut threadably installed on the threaded portion of the machine screw.

22. The clamp assembly of claim 21, further comprising:
   threaded holes at the distal ends of the first grip for threaded engagement with the threaded portion of the machine screw; and
   non-threaded rabbet holes at the distal ends of the second grip for receiving the head portion of the machine screws.

23. A clamp assembly configured to be clamped around a tubular beam to provide a mounting location for an auxiliary component, the clamp assembly comprising:
   a first grip having a central portion with at least four separate curved fingers projecting radially from the central portion, each finger having an inside face with two curved surfaces separated by center edges, the center edges of the first grip extending radially from a center axis and curving generally in the same axial direction toward respective attachment portions formed into distal ends of the fingers of the first grip;
   a second grip having a central portion with at least four separate curved fingers projecting radially from the central portion, each finger having an inside face with two curved surfaces separated by center edges, the center edges of the second grip extending radially from a center axis and curving generally in the same axial direction toward respective attachment portions formed into distal ends of the fingers of the second grip;
   a fastener for securing the first and second grips together in a complementary relationship with the attachment portions of the first grip aligning with the attachment portions of the second grip;
   the curved surfaces, when the grips are secured together, defining a first generally cylindrical split aperture extending through the clamp assembly in a first direction and a second generally cylindrical split aperture extending through the clamp assembly in a second direction;
   the first generally cylindrical split aperture having a diameter that substantially corresponds to the diameter of the tubular beam to which the clamp assembly is to be clamped; and
   a flange mounted to one of the grips and being configured to receive the auxiliary component.

24. The clamp assembly of claim 23, wherein the center edges of the first grip mirror the center edges of the second grip.

25. The clamp assembly of claim 23, wherein the first generally cylindrical split aperture is smaller than the second generally cylindrical split aperture.

26. A method of moving a clamp assembly between a plurality of differently-sized tubular beams, the method comprising:
   uncoupling a pair of grips of the clamp assembly that are clamped around a first tubular beam having a first size, each of the grips including:
      a central portion and at least four separate fingers curving radially from the central portion and curving generally in the same axial direction to respective distal ends; and
      each finger including an inside face with two curved surfaces separated by a center edge, with the curved surfaces extending in opposite directions to the inside faces of adjacent fingers to form a plurality of partial cylindrical surfaces,
      wherein a first set of partial cylindrical surfaces of the grips align to form a first split aperture sized and shaped to receive the first tubular beam when the distal ends of the grips are coupled together;
   removing the grips from around the first tubular beam;
   moving the clamp assembly to a second tubular beam having a second size that is different from the first size;
   positioning a second set of partial cylindrical surfaces of the grips around the second tubular beam, the second set of partial cylindrical surfaces aligning to form a second split aperture sized and shaped to receive the second tubular beam; and
   coupling together the distal ends of the grips to clamp and secure the clamp assembly to the second tubular beam.

27. The method of claim 26, further comprising:
   disengaging a flange mounted to one of the first and second grips in first angular position relative to the clamp assembly;
   rotating the flange; and
   re-engaging the flange to the grip in a second angular position that is different from the first angular position.

\* \* \* \* \*